United States Patent
Nakajima et al.

(10) Patent No.: US 11,284,630 B2
(45) Date of Patent: Mar. 29, 2022

(54) BEVERAGE CONTAINING TEA POLYMERIZED POLYPHENOL AND REBD AND/OR REBM

(71) Applicant: SUNTORY HOLDINGS LIMITED, Osaka (JP)

(72) Inventors: Makoto Nakajima, Kanagawa (JP); Yasuyuki Kobayashi, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 30 days.

(21) Appl. No.: 16/839,682

(22) Filed: Apr. 3, 2020

(65) Prior Publication Data

US 2020/0296986 A1    Sep. 24, 2020

Related U.S. Application Data

(63) Continuation of application No. 15/567,284, filed as application No. PCT/JP2017/013547 on Mar. 31, 2017, now Pat. No. 10,645,943.

(30) Foreign Application Priority Data

Mar. 31, 2016 (JP) .............................. JP2016-072720

(51) Int. Cl.
| | | |
|---|---|---|
| A23L 3/22 | (2006.01) | |
| A23F 3/22 | (2006.01) | |
| A23L 2/52 | (2006.01) | |
| A23L 27/30 | (2016.01) | |
| A23F 3/16 | (2006.01) | |
| A23L 2/60 | (2006.01) | |
| A23L 33/105 | (2016.01) | |
| A23F 3/20 | (2006.01) | |
| A23L 2/56 | (2006.01) | |

(52) U.S. Cl.
CPC .................. *A23F 3/22* (2013.01); *A23F 3/16* (2013.01); *A23F 3/20* (2013.01); *A23L 2/52* (2013.01); *A23L 2/56* (2013.01); *A23L 2/60* (2013.01); *A23L 27/36* (2016.08); *A23L 33/105* (2016.08); *A23V 2002/00* (2013.01)

(58) Field of Classification Search
CPC ................ A61K 2300/00; A61K 36/82; A23V 2002/00; A23V 2250/214; A23V 2250/2132; A23V 2250/21; A23L 33/105; A23L 2/60; A23L 33/10; A23L 27/30; A23F 3/16
See application file for complete search history.

(56) References Cited

U.S. PATENT DOCUMENTS

| | | |
|---|---|---|
| 7,014,876 B2 | 3/2006 | Iwasaki et al. |
| 9,169,285 B2 | 10/2015 | Prakash et al. |
| 2008/0226776 A1 | 9/2008 | Roy et al. |
| 2010/0330244 A1 | 12/2010 | Nonaka et al. |
| 2011/0091635 A1 | 4/2011 | Abelyan et al. |
| 2011/0092625 A1 | 4/2011 | Abelyan et al. |
| 2014/0099403 A1 | 4/2014 | Prakash et al. |
| 2014/0322389 A1 | 10/2014 | Prakash et al. |
| 2014/0357588 A1 | 12/2014 | Markosyan et al. |
| 2015/0017284 A1 | 1/2015 | Prakash et al. |
| 2015/0216218 A1 | 8/2015 | Prakash et al. |
| 2016/0058053 A1 | 3/2016 | Markosyan et al. |
| 2016/0198750 A1 | 7/2016 | Carlson et al. |
| 2016/0213039 A1 | 7/2016 | Kumar et al. |
| 2019/0116857 A1 | 4/2019 | Nakajima et al. |

FOREIGN PATENT DOCUMENTS

| | | |
|---|---|---|
| EP | 1 472 932 | 11/2004 |
| EP | 2 826 381 A1 | 1/2015 |
| JP | 2009-517037 A | 4/2009 |
| JP | 2013-507914 A | 3/2013 |
| JP | 2015-502404 A | 1/2015 |
| WO | 01/11988 | 2/2001 |
| WO | 2005/077384 A1 | 8/2005 |
| WO | 2007/081442 A2 | 7/2007 |
| WO | 2011/046423 A1 | 4/2011 |
| WO | 2011/097359 | 8/2011 |
| WO | 2015/023928 A1 | 2/2015 |

OTHER PUBLICATIONS

Henning et al., "Catechin Content of 18 Teas and a Green Tea Extract Supplement Correlates with the Antioxidant Capacity" *Nutrition and Cancer* 45(2), 226-235, 2003.
International Search Report issued in PCT/JP2017/013547, dated Jul. 4, 2017.
Decision to Grant a Patent issued in JP 2017-538259, dated Oct. 5, 2017.
Prakash et al., "Development of Next Generation Stevia Sweetener: Rebaudioside M" *Foods* 3:162-175, 2014.
Extended European Search Report issued in EP Patent Application No. 17775520.4, dated May 16, 2018.
Third-party submission filed on Jun. 11, 2019 against U.S. Appl. No. 16/090,002.
International Search Report of PCT/JP2017/013577 dated Jun. 14, 2017.
Extended European Search Report for EP Application No. 17775529.5 dated Oct. 2, 2019.

(Continued)

*Primary Examiner* — Hong T Yoo
(74) *Attorney, Agent, or Firm* — Greenblum & Bernstein, P.L.C.

(57) ABSTRACT

Tea polymerized polyphenol-containing beverages having reduced bitterness and astringency of tea polymerized polyphenols while maintaining tea-like preferable flavors, methods of production thereof, and the like are provided. The content of tea polymerized polyphenols in a beverage is adjusted to within a certain range, the total content of RebM and RebD in the beverage is adjusted to within a certain range, and the weight ratio of the total content of RebD and RebM to the content of the tea polymerized polyphenols is adjusted to within a certain range.

8 Claims, 3 Drawing Sheets

(56) References Cited

OTHER PUBLICATIONS

Non-Final Office Action in related U.S. Appl. No. 16/090,002, dated Oct. 3, 2019.
Third-party submission filed on Oct. 24, 2018 against U.S. Appl. No. 15/567,284.
Journal of Chemical and Pharmaceutical Research, 2013, 5(9), Structural Characterization of the Hydrolysis Products of Rebaudioside M, a Minor Steviol Glycoside of Stevia Rebaudiana Bertoni, pp. 606-611, (Year: 2013).
Foods 2014, 3, Development of Next Generation Stevia Sweetener: Rebaudioside M, pp. 162-175 (Year: 2014).

Figure 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Tea polymerized polyphenol (ppm) (A) | 5 | 30 | 20 | 140 | 85 | 120 | 20 | 20 | 20 | 100 |
| RebD(ppm) (B) | 45 | 250 | 30 | 280 | 180 | 250 | 180 | 50 | 20 | 120 |
| B/A | 9.0 | 8.3 | 1.5 | 2.0 | 2.1 | 2.1 | 9.0 | 2.5 | 1.0 | 1.2 |
| Masking effect on bitterness and astringency | O | O | O | O | O | O | O | O | O | O |
| Tea-like flavor | O | O | O | O | ◉ | ◉ | O | O | O | O |

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Tea polymerized polyphenol (ppm) (A) | 30 | 200 | 200 | 20 | 3 | 5 | 40 | 20 |
| RebD(ppm) (B) | 330 | 250 | 350 | 10 | 20 | 60 | 30 | 250 |
| B/A | 11.0 | 1.3 | 1.8 | 0.5 | 6.7 | 12.0 | 0.8 | 12.5 |
| Masking effect on bitterness and astringency | × | × | × | O | O | × | × | O |
| Tea-like flavor | × | × | × | × | × | × | × | × |

Figure 2

|  | Example 11 | Example 12 | Example 13 | Example 14 |
|---|---|---|---|---|
| Tea polymerized polyphenol (ppm) (A) | 5 | 140 | 20 | 20 |
| RebM(ppm) (M) | 45 | 280 | 180 | 20 |
| M/A | 9.0 | 2.0 | 9.0 | 1.0 |
| Masking effect on bitterness and astringency | O | O | O | O |
| Tea-like flavor | O | O | O | O |

|  | Comparative Example 9 | Comparative Example 10 | Comparative Example 11 | Comparative Example 12 | Comparative Example 13 | Comparative Example 14 |
|---|---|---|---|---|---|---|
| Tea polymerized polyphenol (ppm) (A) | 200 | 200 | 20 | 3 | 5 | 40 |
| RebM(ppm) (M) | 250 | 350 | 10 | 20 | 60 | 30 |
| M/A | 1.3 | 1.8 | 0.5 | 6.7 | 12.0 | 0.8 |
| Masking effect on bitterness and astringency | × | × | O | O | × | × |
| Tea-like flavor | × | × | × | × | × | × |

Figure 3

|  | Comparative Example 15 | Comparative Example 16 |
|---|---|---|
| Tea polymerized polyphenol (ppm) (A) | 20 | 20 |
| RebA(ppm) (C) | 180 | 20 |
| C/A | 9.0 | 1.0 |
| Masking effect on bitterness and astringency | × | × |
| Tea-like flavor | ○ | ○ |

BEVERAGE CONTAINING TEA POLYMERIZED POLYPHENOL AND REBD AND/OR REBM

CROSS-REFERENCE TO RELATED APPLICATIONS

This is a continuation application of U.S. patent. Ser. No. 15/567,284, filed on Oct. 17, 2017, which is a U.S. National stage of International Patent Application No. PCT/JP2017/013547, filed on Mar. 31, 2017 which claims priority to Japanese Patent Application No. 2016-072720, filed on Mar. 31, 2016. The disclosure of each of these applications is herein incorporated by reference in its entirety.

TECHNICAL FIELD

Embodiments of the present invention relate to a beverage containing tea polymerized polyphenol and RebD and/or RebM.

BACKGROUND ART

Physiological effects of polyphenols have recently attracted attention due to the increase in health consciousness and the demand for polyphenol-rich beverages has increased too. For example, tea polymerized polyphenols, a type of polyphenols, are known to have a lipase inhibition effect, as described in Patent Literature 1, and there are needs for beverages containing tea polymerized polyphenols.

Patent Literature 2 describes sweetener compositions and sweetened compositions containing one or more steviol glycosides including Rebaudioside X (RebX).

CITATION LIST

Patent Literature

Patent Literature 1: WO 2005/077384
Patent Literature 2: National Publication of International Patent Application No. 2015-502404

SUMMARY

Technical Problem

Objects of embodiments of the present invention are to provide tea polymerized polyphenol-containing beverages having reduced bitterness and astringency of tea polymerized polyphenols while maintaining tea-like preferable flavors, methods of production thereof, and the like.

Solution to Problem

Embodiments of the present invention provide beverages comprising a tea polymerized polyphenol at a content of 5 to 150 ppm and RebD and/or RebM at a total content of 20 to 300 ppm, wherein a weight ratio of a total content (B) of RebD and RebM to a content (A) of the tea polymerized polyphenol (B/A) is 1.0 to 9.0, and others, but embodiments of the present invention are not limited thereto.

BRIEF DESCRIPTION OF DRAWINGS

FIG. 1 illustrates the results of evaluation of masking effect of a tea polymerized polyphenol content (A) and a RebD content (B) in beverages and a weight ratio (B/A) thereof on bitterness and astringency characteristic of tea polymerized polyphenols and the effect thereof on the tea-like flavor.

FIG. 2 illustrates the results of evaluation of masking effect of a tea polymerized polyphenol content (A) and a RebM content (M) in beverages and a weight ratio (M/A) thereof on bitterness and astringency characteristic of tea polymerized polyphenols and the effect thereof on the tea-like flavor.

FIG. 3 illustrates the results of evaluation of masking effect of RebA on bitterness and astringency characteristic of tea polymerized polyphenols and the effect thereof on the tea-like flavor.

DESCRIPTION OF EMBODIMENTS

<Beverage>

Figure 4:
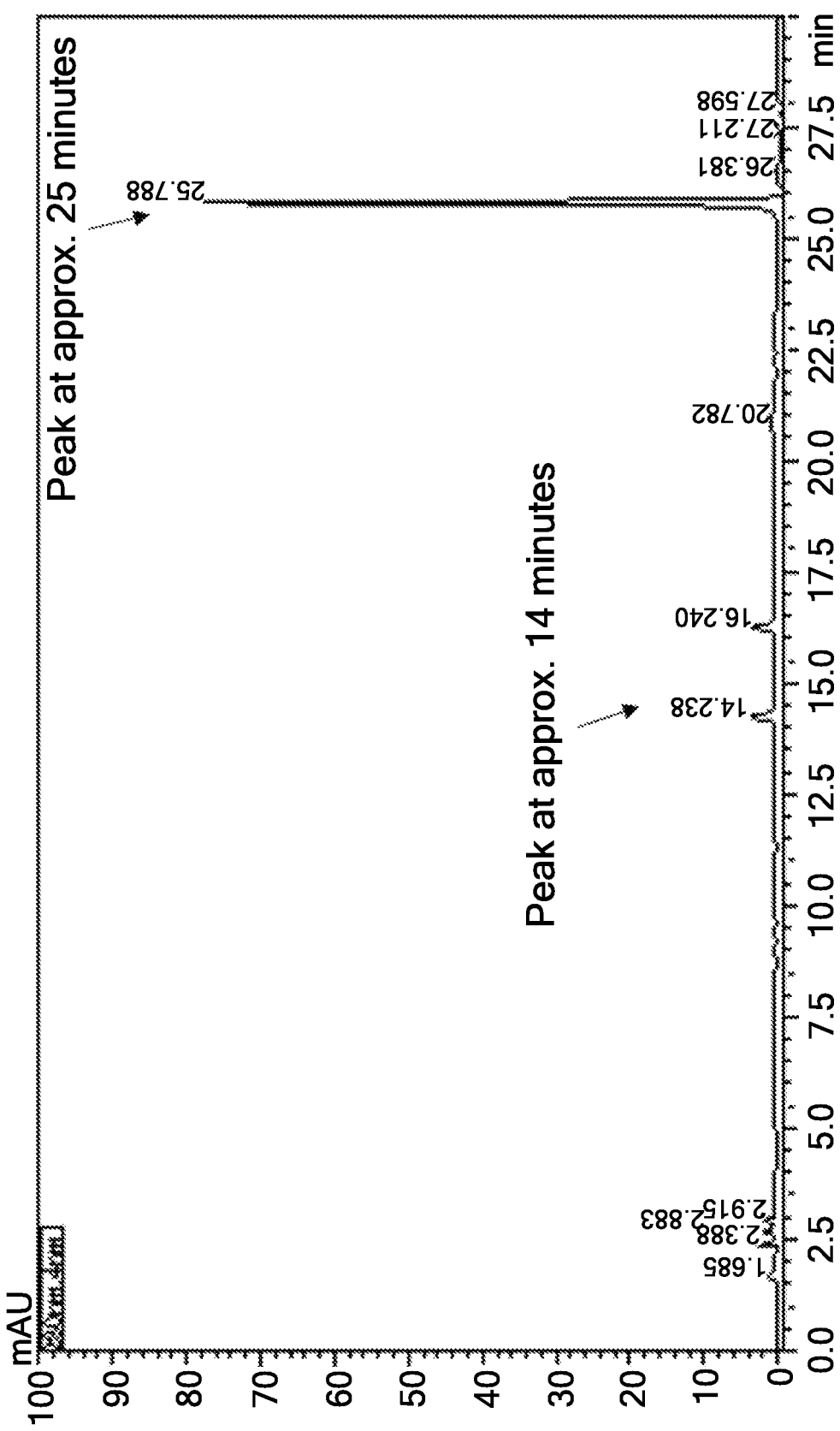
FIG. 4 is an example of HPLC charts obtained by measuring samples containing a tea polymerized polyphenol.

Embodiments of the present invention are beverages comprising a tea polymerized polyphenol at a content within a certain range and RebD and/or RebM at a total content within a certain range, wherein the weight ratio of the total content of RebD and RebM to the content of the tea polymerized polyphenol is within a certain range.

Tea polymerized polyphenols (also referred to as tea polymerized catechins) are known to be a type of polyphenols and have a characteristic bitter taste and astringency. As used herein, the bitter taste and astringency characteristic of tea polymerized polyphenols may be described as the "bitterness and astringency".

In embodiments of the invention, the content of the tea polymerized polyphenol is 5 to 150 ppm (0.0005 to 0.015% by weight), preferably 30 to 140 ppm, more preferably 40 to 130 ppm, further more preferably 60 to 125 ppm, and most preferably 85 to 120 ppm relative to the weight of the beverage. Unless otherwise specified, "ppm", as used herein, means weight/weight (w/w) ppm.

The "tea polymerized polyphenol" as used herein refers to a component that has a structure in which plural non-polymerized, monomeric catechins ((+)-catechin, (−)-epicatechin, (+)-gallocatechin, (−)-epigallocatechin, (−)-catechin gallate, (−)-epicatechin gallate, (−)-gallocatechin gallate, (−)-epigallocatechin gallate (herein, these are also described as the "non-polymeric catechin")) are linked by a tea-derived enzyme, an enzyme, light, pH change or the like and that exhibits a peak at the same elution time (reference elution time: 25 minutes) as theaflavin (a product of Kurita Research Center) when analyzed by HPLC in the following conditions.

Column: TSK-gel ODS-80TsQA (4.6 mmφ×150 mm, Tosoh Corporation);
Mobile phase:
  A: water:acetonitrile:trifluoroacetic acid=900:100:0.5;
  B: water:acetonitrile:trifluoroacetic acid=200:800:0.5
Flow rate: 1.0 ml/min
Column temperature: 40° C.
Gradient conditions:
  0% Solution B from the start of analysis to 5 minutes later,
  8% Solution B from 5 minutes to 11 minutes,
  10% Solution B from 11 minutes to 21 minutes,
  100% Solution B from 21 minutes to 22 minutes,
  Maintaining 100% from 22 minutes to 30 minutes,
  0% from 30 minutes to 31 minutes.

Detection: A280 nm (data collection time 30 minutes), quantified in peak area.
Injection volume: 10 μL
Standard substance: Oolonghomobisflavan B (abbreviation: OHBF-B)

The amount of tea polymerized polyphenols is determined by using OHBF-B as a standard substance and preparing a standard curve. OHBF-B used as the standard substance may be, for example, one synthesized (preferably purified to a purity of 98% or more) according to the method described in Chem. Pharm. Bull 37 (12), 3255-3563 (1989) or the method described in Japanese Patent Laid-Open No. 2005-336117 (Example 3), one isolated from tea leaves, or the like.

Under the analysis conditions described above, a peak of a tea polymerized polyphenol may overlap with a peak of another component. Examples of beverages containing such another component include beverages containing fruit juice, beverages containing a plant extract, and the like. In such a case, the analysis conditions described above are not suitable for quantification of the tea polymerized polyphenol, although they are suitable for identification thereof. In such a case, a peak that appears at approximately 14 minutes is used for the quantification. The value obtained by multiplying the peak area of the peak at approximately 14 minutes by 10 and the peak area of the peak at approximately 25 minutes are compared. If the former value is lower, then the former value is used for quantification of the tea polymerized polyphenol. An example of HPLC charts in which these peaks are seen is shown in FIG. 4.

In embodiments of the present invention, the origin of the tea polymerized polyphenol is not particularly limited. For example, it may be one derived from a natural product, one obtained on the market, or one synthesized by an organic chemical method, but it is preferably a tea polymerized polyphenol derived from a natural product in view of a recent increase in nature orientation. Examples of the natural products include, but are not limited to, tea (green tea, white tea, black tea, oolong tea, mate, and the like). In embodiments of the present invention, the tea polymerized polyphenol is preferably derived from tea and more preferably derived from tea leaves of half fermented tea or fermented tea containing a plenty of the tea polymerized polyphenol, in particular derived from oolong tea leaves. Moreover, the tea polymerized polyphenol may be a mixture of tea polymerized polyphenols of different origins.

The tea polymerized polyphenol used in embodiments of the present invention is exemplified by, besides the tea polymerized polyphenol called with common names such as thearubigin specifically, tea polymerized polyphenols such as an epigallocatechin gallate dimer represented by the formula (1):

[Formula 1]

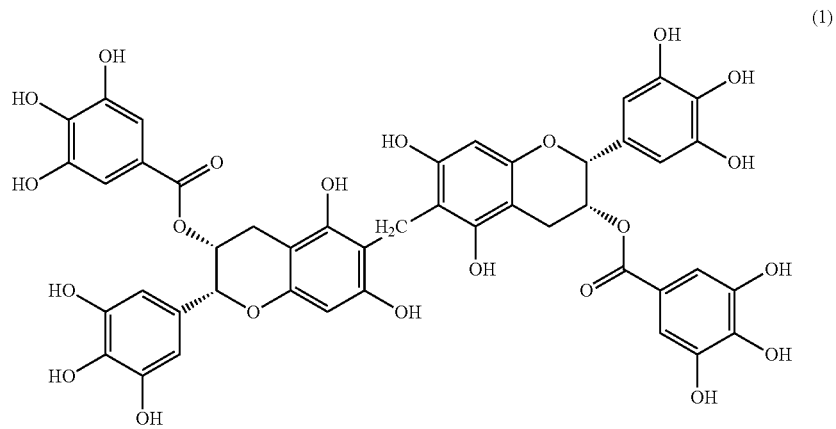

(1)

an epigallocatechin gallate trimer represented by the formula (2):

[Formula 2]

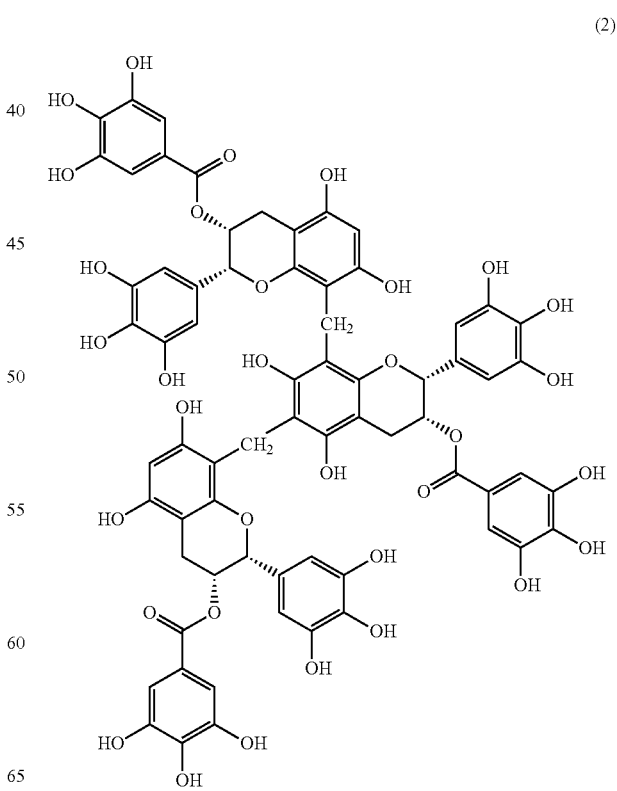

(2)

an epigallocatechin dimer represented by the formula (3):

[Formula 3]

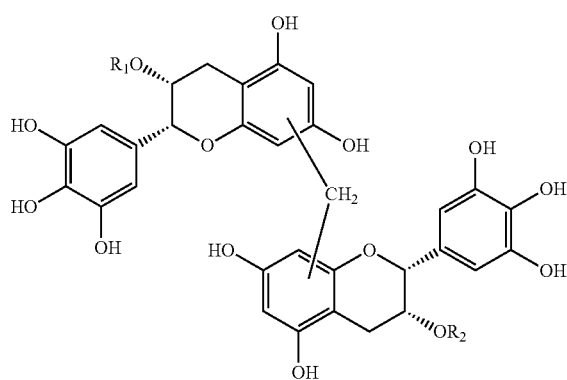

(3)

wherein R1 and R2 are each independently H or a galloyl group;

an epigallocatechin trimer represented by the formula (4):

[Formula 4]

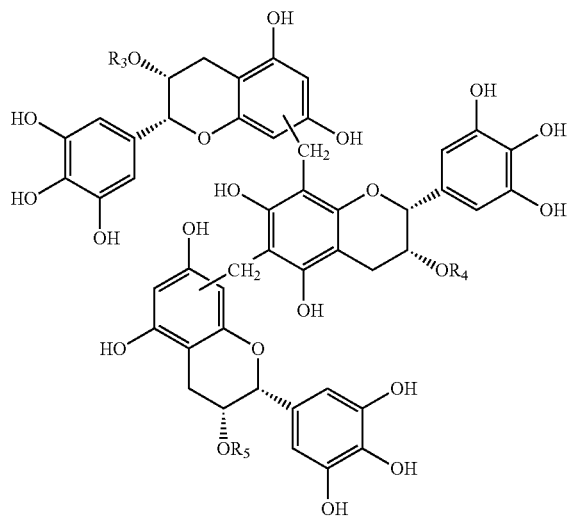

(4)

wherein R3, R4 and R5 are each independently H or a galloyl group;

oolongtheanin-3'-O-gallate represented by the formula (5):

[Formula 5]

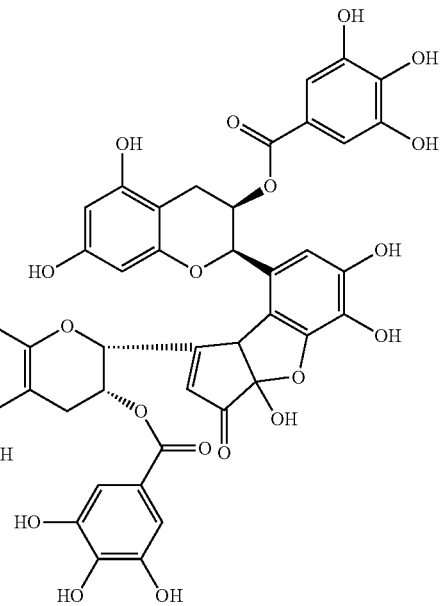

(5)

and may be selected from the group consisting of these compounds.

In embodiments of the invention, the tea polymerized polyphenol can be obtained as a plant extract containing the tea polymerized polyphenol. The plant extract is preferably derived from *Camellia sinensis*. It is obtained, for example, by a solvent extraction from tea leaves of *Camellia sinensis*. Tea leaves used as a raw material may be one or more of green tea, which is unfermented tea, oolong tea, which is half fermented tea, and black tea, which is fermented tea, but, among others, tea leaves of half fermented tea or fermented tea containing a plenty of the tea polymerized polyphenol, in particular tea leaves of oolong tea are preferably used. Extraction solvents that may be used include water or hot water, methanol, ethanol, isopropanol, ethyl acetate, and the like and it may be extracted with one or a mixture of 2 or more of these. A preferred extraction solvent is hot water, to which sodium bicarbonate may be added as needed. A solvent extract of these tea leaves may be used as it is without purification, but a concentrated or purified extract, that is, a solvent extract of tea leaves from which components other than the tea polymerized polyphenol are selectively removed to increase the content of the tea polymerized polyphenol is preferably used. Since non-polymeric catechin generally has bitterness and astringency, it is particularly preferable that non-polymeric catechin is selectively removed. Examples of extracts thus obtained include extracts containing a tea polymerized polyphenol at a concentration which is 4 times or more high as the concentration of non-polymeric catechin described in WO2005/077384 and the like.

Moreover, tea leaves may be subjected to extraction as it is or subjected to extraction after treating the tea leaves containing the tea polymerized polyphenol and the non-polymeric catechin with an enzyme such as polyphenol oxidase or the like to further increase the degree of polymerization of the tea polymerized polyphenol or an extract may be subjected to such an enzymatic treatment. The higher the degree of polymerization is and the higher the ratio of the tea polymerized polyphenol to the non-polymeric catechin is, the less unpleasant bitterness and astringency is present and the more preferable the flavor becomes.

In beverages of embodiments of the present invention, low contents of non-polymeric catechin are preferable. The weight ratio (tea polymerized polyphenol content/non-polymeric catechin content) of the tea polymerized polyphenol content to the non-polymeric catechin content in the beverages is preferably 1 or more, more preferably 1.2 or more, and more preferably 1.4 or more. To produce such beverages, the technique described in WO2005/077384 or the like may be used.

Rebaudiosides (hereinafter, abbreviated as "Rebs") are known as sweet components contained in *Stevia* extracts. The *Stevia* extracts are extracts obtained by extraction and/or purification from *Stevia* dry leaves. *Stevia* is a perennial plant in Asteraceae that is native to Paraguay in South America and its scientific name is *Stevia Rebaudiana Bertoni*. Because *Stevia* contains components having about 300 times or more the sweetness of sugar, it is grown for extraction and use of these sweet components as a natural sweetener. Known Rebs include RebA, RebB, RebC, RebD, and RebE. Furthermore, the presence of various glycosides such as RebM described in National Publication of International Patent Application No. 2012-504552 has been recently reported. Embodiments of the present invention involve particularly RebM and RebD as *Stevia* extracts. RebD and RebM may be obtained on the market or synthesized by an organic chemical method. Moreover, RebD and RebM may be separated and purified from a *Stevia* extract as a starting raw material. For example, RebD can be purified according to the method described in U.S. Pat. No. 8,414,949 and RebM can be purified according to the method described in Foods 2014, 3 (1), 162-175; doi: 10.3390/foods3010162. Methods for analyzing RebD and RebM are not particularly limited and known methods may be used, but, for example, they can be analyzed with a high performance liquid chromatograph (HPLC) under the conditions described in National Publication of International Patent Application No. 2012-504552. RebD and RebM are analyzed herein by the method, unless otherwise described.

Beverages of embodiments of the present invention may contain one or both of RebD and RebM and the total content of RebD and RebM relative to the weight of the beverage is 20 to 300 ppm (0.002 to 0.03% by weight), preferably 30 to 290 ppm, more preferably 40 to 280 ppm, and further more preferably 60 to 250 ppm.

In embodiments of the present invention, bitterness and astringency characteristic of tea polymerized polyphenols can be reduced while maintaining the tea-like preferable flavor in the tea polymerized polyphenol-containing beverages by adjusting the content of the tea polymerized polyphenol and the total content of RebD and RebM within the ranges described above. In embodiments of the present invention, tastes and aromas of the tea polymerized polyphenol itself may remain as long as bitterness and astringency characteristic of tea polymerized polyphenols can be reduced. The "tea-like preferable flavor" as used herein refers to having a refreshing aroma and a rich taste characteristic of tea.

Further, in the embodiments, the weight ratio of a total content (B) of RebD and RebM to a content (A) of the tea polymerized polyphenol ([total content of RebD and RebM])/[content of tea polymerized polyphenol] (B/A)) is 1.0 to 9.0, preferably 1.4 to 7.0, more preferably 1.6 to 6.0, and further preferably 2.0 to 5.0. If A and B meet the conditions, then bitterness and astringency characteristic of tea polymerized polyphenols can be effectively reduced while maintaining the tea-like preferable flavor in the tea polymerized polyphenol-containing beverages.

Moreover, in beverages of embodiments of the present invention, the content of RebD relative to the weight of the beverage is 20 to 300 ppm (0.002 to 0.03% by weight), preferably 30 to 290 ppm, more preferably 40 to 280 ppm, and further more preferably 60 to 250 ppm. Furthermore, in embodiments of the invention, the weight ratio of the content of RebD to the content of the tea polymerized polyphenol ([content of RebD]/[content of tea polymerized polyphenol]) is 1.0 to 9.0, preferably 1.4 to 7.0, more preferably 1.6 to 6.0, and further more preferably 2.0 to 5.0.

In beverages of an embodiment of the present invention, the content of RebM relative to the weight of the beverage is 20 to 300 ppm (0.002 to 0.03% by weight), preferably 30 to 290 ppm, more preferably 40 to 280 ppm, and further more preferably 60 to 250 ppm. Furthermore, in beverages of an embodiment of the invention, the weight ratio of the content of RebM to the content of the tea polymerized polyphenol ([content of RebM]/[content of tea polymerized polyphenol]) is 1.0 to 9.0, preferably 1.4 to 7.0, more preferably 1.6 to 6.0, and further more preferably 2.0 to 5.0.

Beverages of embodiments of the present invention may contain, as needed, additives usually contained in beverages, for example, antioxidants, emulsifiers, nutrient supplements (vitamins, calcium, minerals, amino acids), flavors, pigments, preservatives, flavoring agents, extracts, pH regulators, quality stabilizer, fruit juice, fruit juice puree, and the like. These additives may be blended singly in the beverages or a plurality of these components may be blended in combination in the beverages.

Embodiments of the present invention are not particularly limited, but examples include refreshing beverages, non-alcoholic beverages, alcoholic beverages, and the like. The beverages may be beverages containing no carbonic acid gas or may be beverages containing carbonic acid gas. Examples of the beverages containing no carbonic acid gas include, but are not limited to, tea beverages such as green tea, oolong tea, black tea, barley tea, mate, and the like, coffee, fruit juice beverages, milk beverages, sports drinks, and the like. Examples of the beverages containing carbonic acid gas include, but are not limited to, cola, diet cola, ginger ale, soda pop, and carbonated water provided with a fruit juice flavor. In particular, from a point of view to maintain the tea-like preferable flavor, embodiments of the present invention are preferably tea beverages such as green tea, oolong tea, black tea, barley tea, mate, and the like.

Beverages of embodiments of the present invention may be provided in containers, as needed. The form of the containers is not limited at all and the beverages may be filled into containers such as bottles, cans, barrels, or PET bottles and provided as beverages in containers. Moreover, the method of filling the beverages into containers is not particularly limited.

<Method of Producing Beverage and Method of Reducing Bitterness and Astringency of Tea Polymerized Polyphenols While Maintaining Tea-Like Preferable Flavor in Beverage>

According to another aspect of embodiments of the present invention, methods of producing beverages are provided. A method of production according to an embodiment of the present invention comprises the step of blending a tea polymerized polyphenol and RebD and/or RebM such that the content of the tea polymerized polyphenol becomes 5 to 150 ppm, the total content of RebD and RebM becomes 20 to 300 ppm in beverages, and the weight ratio of a total content (B) of RebD and RebM to a content (A) of the tea polymerized polyphenol (B/A) is 1.0 to 9.0. The method of blending the tea polymerized polyphenol is not particularly limited and, for example, the tea polymerized polyphenol itself may be blended or a raw material containing the tea polymerized polyphenol may be blended. Moreover, the method of blending RebD and/or RebM is not particularly limited as well and RebD and/or RebM itself may be blended or a raw material containing RebD and/or RebM may be blended. Preferable tea polymerized polyphenols and preferable content ranges thereof, preferable total content ranges of RebD and RebM, and preferable ranges of the weight ratio (B/A) are as described above as for beverages.

The method of production according to the embodiment of the present invention may comprise the step of blending an additive that is usually blended into beverages and/or the step of filling a beverage into a container. Types of the additive and the container are as described above as for beverages and filling of the container may be done by using a known method.

The method of production according to the embodiment of the present invention can reduce bitterness and astringency characteristic of tea polymerized polyphenols while maintaining a tea-like preferable flavor in tea polymerized polyphenol-containing beverages. Accordingly, the method of production is, in another aspect, a method for reducing bitterness and astringency of tea polymerized polyphenols while maintaining a tea-like preferable flavor in a beverage.

Hereinafter, embodiments of the present invention are described referring to specific examples, but the present invention is not limited thereto.

The effect of the tea polymerized polyphenol content (A), RebD and/or RebM content (B) in beverages, and the weight ratio (B/A) thereof on the tea-like preferable flavor and the bitterness and astringency of tea polymerized polyphenols can be determined as follows. The tea polymerized polyphenol and RebD were blended and sample beverages (Example 1 to 10, Comparative Examples 1 to 8) were prepared. The tea polymerized polyphenol content and the RebD content in the samples were measured. Furthermore, based on the tea polymerized polyphenol content (A) and the RebD content (B) measured, the RebD content/tea polymerized polyphenol content weight ratio (B/A) was calculated. Subsequently, a sensuality evaluation test for "masking effect of bitterness and astringency" and "tea-like flavor" by expert panels was conducted by tasting of sample beverages according to the following standards. 5 expert panels conducted the evaluation and graded the samples 1 to 5 points at 0.1 points intervals for the evaluation criteria. x was marked when the average of points by the 5 panels is less than 3; ○ was marked when the average is equal to or more than 3 and less than 4.5: and ⊚ was marked when the average is equal to or more than 4.5.

<Criteria for Sensuality Evaluation>

⊚: very preferable

○: preferable x: unfavorable

The tea polymerized polyphenol content and the RebD content in sample beverages and the results of the sensuality evaluation are illustrated in FIG. 1. It was shown, as described in FIG. 1, that bitterness and astringency of the tea polymerized polyphenol can be masked while maintaining the tea-like flavor by adjusting the tea polymerized polyphenol content and the RebD content within the range according to the present invention and adjusting the weight ratio of RebD content/tea polymerized polyphenol content within the range according to the present invention.

The tea polymerized polyphenol additionally blended in the description above was prepared as follows.

600 kg of oolong tea leaves were subjected to an extraction treatment with 7800 kg of a sodium bicarbonate solution obtained by adding 0.15% by weight of sodium bicarbonate into hot water (95° C.) to obtain approximately 7000 kg of an oolong tea extract. Non-polymeric catechin and caffeine were removed by passing the extract through 400 kg of granular active carbon (GW-H32/60 manufactured by Kuraray Co., Ltd.) while maintaining the temperature of this extract within 60 to 65° C. This passage liquid (liquid after the active carbon treatment) was concentrated under reduced pressure to obtain approximately 900 kg of a high content tea polymerized polyphenol extract (concentrate of oolong tea extract, extract) with Brix 11. The tea polymerized polyphenol concentration in extract A obtained was measured by HPLC under the conditions described above. As a result, the concentration of the tea polymerized polyphenol was 12,000 ppm.

Moreover, sample beverages (Examples 11 to 14, Comparative Examples 9 to 14) were prepared in the same way as described above except that RebM was used instead of RebD. It was also demonstrated that if the tea polymerized polyphenol content, the RebM content, and weight ratio (M/A) of rebM content/tea polymerized polyphenol content were adjusted within the range according to the present invention, then bitterness and astringency of the tea polymerized polyphenol can be masked while maintaining the tea-like flavor, similar to the case with RebD (FIG. 2).

Furthermore, the difference between the effects of different Rebs on the tea-like preferable flavor and bitterness and astringency of tea polymerized polyphenols in tea polymerized polyphenol-containing beverages was examined as follows. First, sample beverages of Comparative Examples 15 and 16 were prepared in the same way as described above except that RebA was used instead of RebD and RebM. The tea polymerized polyphenol content and the RebA content in each beverage were measured and weight ratio (C/A) of RebA content/tea polymerized polyphenol content was calculated (FIG. 3). A sensuality evaluation test was conducted according to the method described above. The results are shown in FIG. 3. It was revealed, as described in FIG. 3, that the effect that allows masking bitterness and astringency of tea polymerized polyphenols while maintaining the tea-like flavor observed with. RebD and RebM was hardly observed with RebA.

Stating for clarification, the numerical range expressed herein with a lower limit value to an upper limit value, namely, "lower limit value to upper limit value" includes the lower limit value and the upper limit level value. For example, the range expressed as "1 to 2" includes 1 and 2.

The invention claimed is:

1. A beverage comprising:
a tea polymerized polyphenol at a content (A) of 5 to 140 ppm and Rebaudioside D (RebD) at a content (B) of 20 to 300 ppm, wherein a weight ratio B/A is 1.0 to 9.0.

2. The beverage according to claim 1, wherein the weight ratio B/A is 2.0 to 5.0.

3. The beverage according to claim 1, further comprising a non-polymeric catechin, wherein a weight ratio of the content of the tea polymerized polyphenol to the content of the non-polymeric catechin (tea polymerized polyphenol content/non-polymeric catechin content) is 1 or more.

4. The beverage according to claim 2, further comprising a non-polymeric catechin, wherein a weight ratio of the content of the tea polymerized polyphenol to the content of the non-polymeric catechin (tea polymerized polyphenol content/non-polymeric catechin content) is 1 or more.

5. A beverage comprising
   a tea polymerized polyphenol at a content (A) of 5 to 140 ppm and
   Rebaudioside D (RebD) and Rebaudioside M (RebM) at a total content (B) of 20 to 300 ppm,
   wherein a weight ratio B/A is 1.0 to 9.0.

6. The beverage according to claim 5, wherein the weight ratio B/A is 2.0 to 5.0.

7. The beverage according to claim 5, further comprising a non-polymeric catechin, wherein a weight ratio of a content of the tea polymerized polyphenol to the content of the non-polymeric catechin (tea polymerized polyphenol content/non-polymeric catechin content) is 1 or more.

8. The beverage according to claim 6, further comprising a non-polymeric catechin, wherein a weight ratio of a content of the tea polymerized polyphenol to the content of the non-polymeric catechin (tea polymerized polyphenol content/non-polymeric catechin content) is 1 or more.

\* \* \* \* \*